United States Patent
Graham et al.

(10) Patent No.: US 7,133,405 B2
(45) Date of Patent: Nov. 7, 2006

(54) IP DATAGRAM OVER MULTIPLE QUEUE PAIRS

(75) Inventors: Charles Scott Graham, Rochester, MN (US); Vivek Kashyap, Beaverton, OR (US); Danny Marvin Neal, Round Rock, TX (US); Renato John Recio, Austin, TX (US); Lee Anton Sendelbach, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 861 days.

(21) Appl. No.: 09/942,747

(22) Filed: Aug. 30, 2001

(65) Prior Publication Data

US 2003/0043805 A1    Mar. 6, 2003

(51) Int. Cl.
    *H04L 12/26* (2006.01)
    *H04L 12/56* (2006.01)
(52) U.S. Cl. ...................................................... 370/392
(58) Field of Classification Search ...................... None
    See application file for complete search history.

(56) References Cited

U.S. PATENT DOCUMENTS 5,390,173 A * 2/1995 Spinney et al. ............. 370/393
6,459,698 B1 * 10/2002 Acharya ..................... 370/392
6,718,392 B1 * 4/2004 Krause ........................ 709/238
6,732,318 B1 * 5/2004 Collier et al. ............... 714/758

\* cited by examiner

Primary Examiner—Chau Nguyen
Assistant Examiner—Cynthia L. Davis
(74) Attorney, Agent, or Firm—Duke W. Yee; Thomas E. Tyson; Gerald H. Glanzman

(57) ABSTRACT

An apparatus and method for an advanced multiplexing technique to allow a single host to support multiple Internet Protocol (IP) queue pairs with little or no overhead are provided. With the apparatus and method, after a queue pair is created, Internet Protocol filter attributes and values are set up for the queue pair through value added features to the standard InfiniBand "QP Modify" method. The IP filters are used during normal operations to determine which queue pair is associated with an incoming packet. During normal operations, when a channel adapter receives an Internet Protocol (IP) over InfiniBand (IB) packet, it uses one or more of several fields in the packet's transport and/or network header to determine which queue pair shall receive the packet. Thus, the host channel adapter uses the IP filters to route incoming packets to the appropriate queue pair and thereby allow more than one queue pair to be used to support IP.

30 Claims, 9 Drawing Sheets

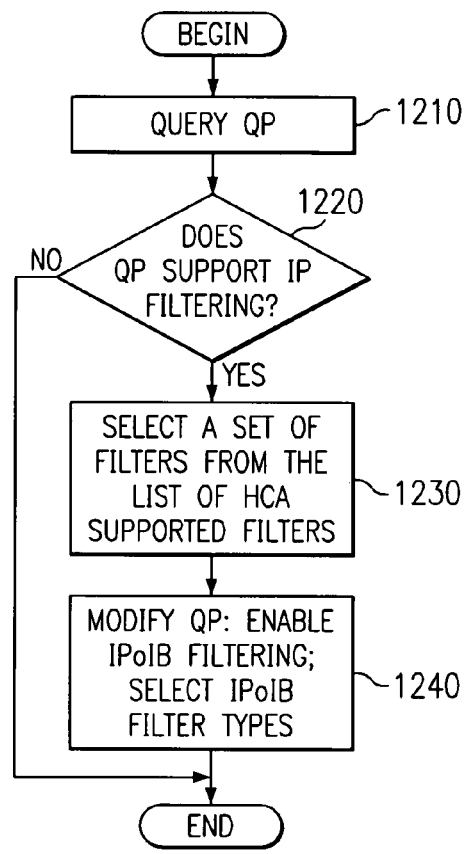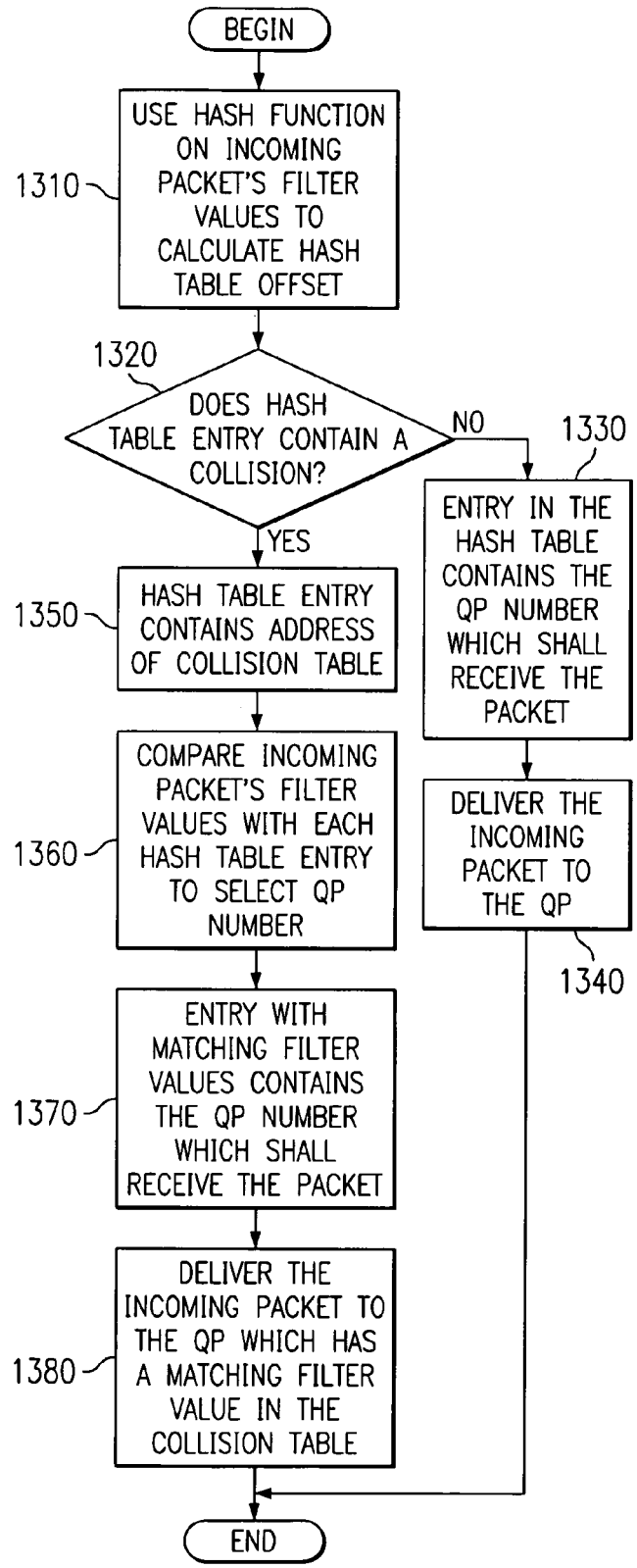

IP DATAGRAM OVER MULTIPLE QUEUE PAIRS

BACKGROUND OF THE INVENTION

1. Technical Field

The present invention is directed to an improved data processing system. More specifically, the present invention provides an apparatus and method for an advanced queue pair multiplexing apparatus and method to allow Internet Protocol (IP) frames to be delivered to more than one queue.

2. Description of Related Art

In a System Area Network (SAN), such as an InfiniBand (IB) network, the hardware provides a message passing mechanism that can be used for Input/Output devices (I/O) and interprocess communications (IPC) between general computing nodes. Processes executing on devices access SAN message passing hardware by posting send/receive messages to send/receive work queues on a SAN channel adapter (CA). These processes also are referred to as "consumers."

The send/receive work queues (WQ) are assigned to a consumer as a queue pair (QP). The messages can be sent over five different transport types: Reliable Connected (RC), Reliable Datagram (RD), Unreliable Connected (UC), Unreliable Datagram (UD), and Raw Datagram (RawD). Consumers retrieve the results of these messages from a completion queue (CQ) through SAN work completion (WC) queues. The source channel adapter takes care of segmenting outbound messages and sending them to the destination. The destination channel adapter takes care of reassembling inbound messages and placing them in the memory space designated by the destination's consumer.

Two channel adapter types are present in nodes of the SAN fabric, a host channel adapter (HCA) and a target channel adapter (TCA). The host channel adapter is used by general purpose computing nodes to access the SAN fabric. Consumers use SAN verbs to access host channel adapter functions. The software that interprets verbs and directly accesses the channel adapter is known as the channel interface (CI).

Target channel adapters (TCA) are used by nodes that are the subject of messages sent from host channel adapters. The target channel adapters serve a similar function as that of the host channel adapters in providing the target node an access point to the SAN fabric.

Standard implementations of the SAN architecture described above use one queue pair per CA port for all Internet Protocol (IP) suite traffic. This presents several problems for the IP traffic. First, for hosts with multiple processors, a single queue pair does not lend itself to multithreading of the IP traffic, because, for example, all the incoming traffic would be received by the shared QP versus being routed to the thread associated with the incoming traffic. Second, as the amount of IP traffic increases, a point is reached where a single queue pair can become a bottleneck, for example, by causing all incoming traffic to be handled by one processor of a multiple processor planar versus distributing the incoming traffic among QPs that are each associated with one processor of the multiple processors. Finally, a single queue pair makes it difficult for a host channel adapter to provide differentiated services, because all traffic is treated equally versus differentiating the service of some of the traffic.

Therefore, it would be beneficial to provide a mechanism which allows a single host channel adapter port to support multiple IP queue pairs.

SUMMARY OF THE INVENTION

The present invention provides an apparatus and method for an advanced multiplexing technique to allow a single host to support multiple Internet Protocol (IP) queue pairs with little or no overhead. With the apparatus and method of the present invention, after a queue pair is created Internet Protocol filter attributes and values are set up for the queue pair through value added features to the standard InfiniBand "QP Modify" method. The IP filters are used during normal operations to determine which queue pair is associated with an incoming packet.

With the apparatus and method of the present invention, during normal operations when a channel adapter receives an Internet Protocol (IP) over InfiniBand (IB) packet, it uses one or more of several fields in the packet's transport and/or network header to determine which queue pair shall receive the packet. This is done by a comparison of the IP filter fields from the packet to the IP filter fields stored in the Queue Pair's Context, only packets with matching fields are received by the QP. Thus, with the present invention, the host channel adapter uses the IP filters to route incoming packets to the appropriate queue pair and thereby allow more than one queue pair to be used to support IP. These and other features and advantages of the present invention will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 12 is a flowchart outlining an exemplary operation of the present invention when setting up a Queue Pair to use IP filtering; and FIG. 13 is a flowchart outlining incoming packet processing according to the present invention.

DETAILED DESCRIPTION OF THE PREFERRED EMBODIMENT

The present invention provides an apparatus and method for managing work and completion queues using head and tail circular buffers. The present invention may be implemented in hardware, software, or a combination of hardware and software. The present invention is preferably implemented in a distributed computing system, such as a system area network (SAN) having end nodes, switches, routers, and links interconnecting these components. Each end node uses send and receive queue pairs to transmit and receives messages. The end nodes segment the message into packets and transmit the packets over the links. The switches and routers interconnect the end nodes and route the packets to the appropriate end node. The end nodes reassemble the packets into a message at the destination.

Figure 1:
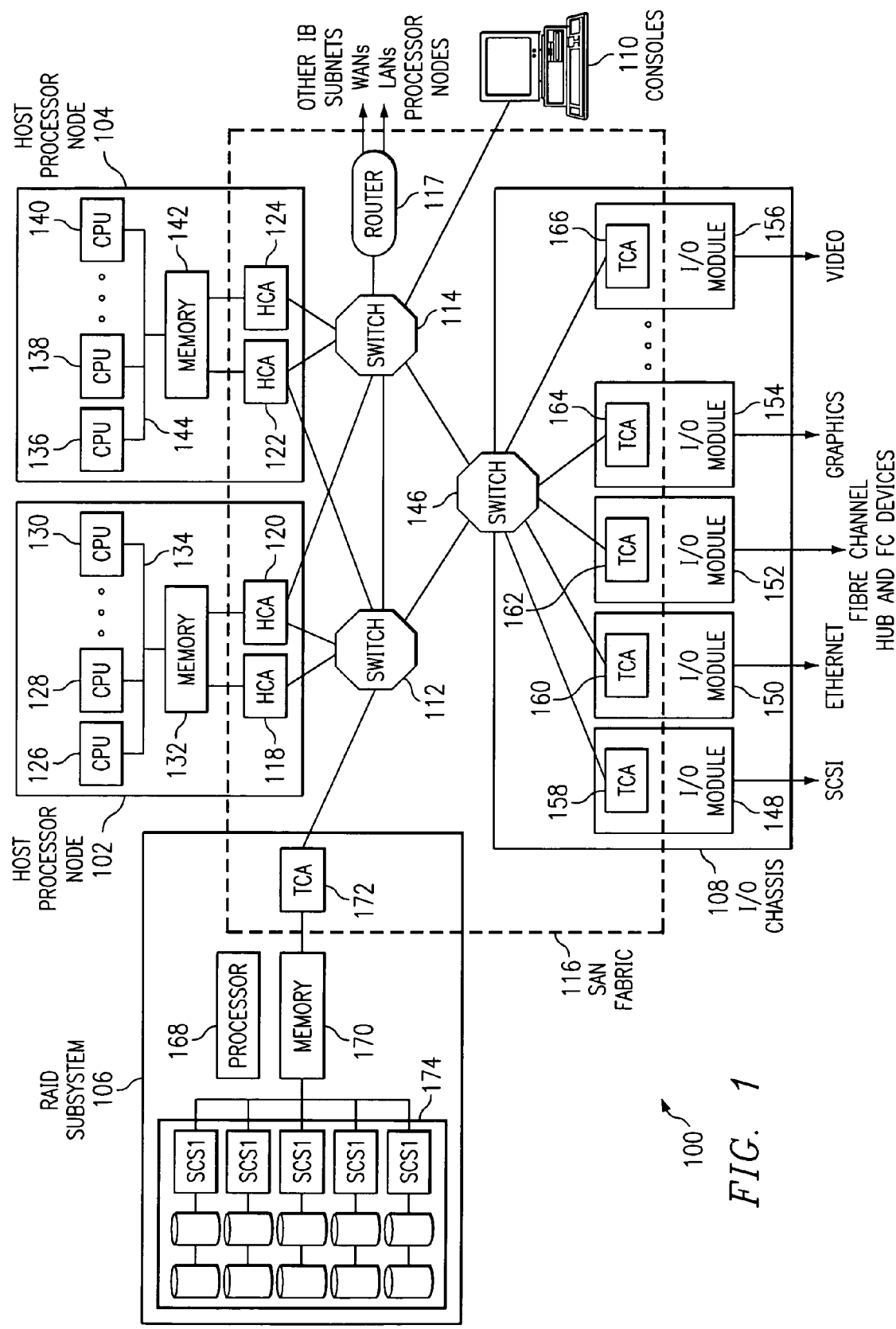
FIG. 1 is a diagram of a distributed computer system is illustrated in accordance with a preferred embodiment of the present invention.

FIG. 1 is a diagram of a distributed computer system in accordance with a preferred embodiment of the present invention. The distributed computer system represented in FIG. 1 takes the form of a system area network (SAN) 100 and is provided merely for illustrative purposes, and the embodiments of the present invention described below can be implemented on computer systems of numerous other types and configurations. For example, computer systems implementing the present invention can range from a small server with one processor and a few input/output (I/O) adapters to massively parallel supercomputer systems with hundreds or thousands of processors and thousands of I/O adapters. Furthermore, the present invention can be implemented in an infrastructure of remote computer systems connected by an Internet or intranet.

SAN 100 is a high-bandwidth, low-latency network interconnecting nodes within the distributed computer system. A node is any component attached to one or more links of a network and forming the origin and/or destination of messages within the network. In the depicted example, SAN 100 includes nodes in the form of host processor node 102, host processor node 104, redundant array independent disk (RAID) subsystem node 106, and I/O chassis node 108. The nodes illustrated in FIG. 1 are for illustrative purposes only, as SAN 100 can connect any number and any type of independent processor nodes, I/O adapter nodes, and I/O device nodes. Any one of the nodes can function as an end node, which is herein defined to be a device that originates or finally consumes messages or frames in SAN 100.

In one embodiment of the present invention, an error handling mechanism in distributed computer systems is present in which the error handling mechanism allows for reliable connection or reliable datagram communication between end nodes in distributed computing system, such as SAN 100.

A message, as used herein, is an application-defined unit of data exchange, which is a primitive unit of communication between cooperating processes. A packet is one unit of data encapsulated by networking protocol headers and/or trailers. The headers generally provide control and routing information for directing the frame through SAN. The trailer generally contains control and cyclic redundancy check (CRC) data for ensuring packets are not delivered with corrupted contents.

SAN 100 contains the communications and management infrastructure supporting both I/O and interprocessor communications (IPC) within a distributed computer system. The SAN 100 shown in FIG. 1 includes a switched communications fabric 116, which allows many devices to concurrently transfer data with high-bandwidth and low latency in a secure, remotely managed environment. End nodes can communicate over multiple ports and utilize multiple paths through the SAN fabric. The multiple ports and paths through the SAN shown in FIG. 1 can be employed for fault tolerance and increased bandwidth data transfers.

The SAN 100 in FIG. 1 includes switch 112, switch 114, switch 146, and router 117. A switch is a device that connects multiple links together and allows routing of packets from one link to another link within a subnet using a small header Destination Local Identifier (DLID) field. A router is a device that connects multiple subnets together and is capable of routing frames from one link in a first subnet to another link in a second subnet using a large header Destination Globally Unique Identifier (DGUID).

In one embodiment, a link is a full duplex channel between any two network fabric elements, such as end nodes, switches, or routers. Example suitable links include, but are not limited to, copper cables, optical cables, and printed circuit copper traces on backplanes and printed circuit boards.

For reliable service types, end nodes, such as host processor end nodes and I/O adapter end nodes, generate request packets and return acknowledgment packets. Switches and routers pass packets along, from the source to the destination. Except for the variant CRC trailer field, which is updated at each stage in the network, switches pass the packets along unmodified. Routers update the variant CRC trailer field and modify other fields in the header as the packet is routed.

In SAN 100 as illustrated in FIG. 1, host processor node 102, host processor node 104, and I/O chassis 108 include at least one channel adapter (CA) to interface to SAN 100. In one embodiment, each channel adapter is an endpoint that implements the channel adapter interface in sufficient detail to source or sink packets transmitted on SAN fabric 100. Host processor node 102 contains channel adapters in the form of host channel adapter 118 and host channel adapter 120. Host processor node 104 contains host channel adapter 122 and host channel adapter 124. Host processor node 102 also includes central processing units 126–130 and a memory 132 interconnected by bus system 134. Host processor node 104 similarly includes central processing units 136–140 and a memory 142 interconnected by a bus system 144.

Host channel adapters 118 and 120 provide a connection to switch 112 while host channel adapters 122 and 124 provide a connection to switches 112 and 114.

In one embodiment, a host channel adapter is implemented in hardware. In this implementation, the host channel adapter hardware offloads much of central processing unit and I/O adapter communication overhead. This hardware implementation of the host channel adapter also permits multiple concurrent communications over a switched network without the traditional overhead associated with communicating protocols. In one embodiment, the host channel adapters and SAN 100 in FIG. 1 provide the I/O and interprocessor communications (IPC) consumers of the distributed computer system with zero processor-copy data transfers without involving the operating system kernel process, and employs hardware to provide reliable, fault tolerant communications.

As indicated in FIG. 1, router 116 is coupled to wide area network (WAN) and/or local area network (LAN) connections to other hosts or other routers. The I/O chassis 108 in FIG. 1 includes an I/O switch 146 and multiple I/O modules 148–156. In these examples, the I/O modules take the form of adapter cards. Example adapter cards illustrated in FIG. 1 include a SCSI adapter card for I/O module 148; an adapter card to fiber channel hub and fiber channel-arbitrated loop (FC-AL) devices for I/O module 152; an ethernet adapter card for I/O module 150; a graphics adapter card for I/O module 154; and a video adapter card for I/O module 156. Any known type of adapter card can be implemented. I/O adapters also include a switch in the I/O adapter backplane to couple the adapter cards to the SAN fabric. These modules contain target channel adapters 158–166.

In this example, RAID subsystem node 106 in FIG. 1 includes a processor 168, a memory 170, a target channel adapter (TCA) 172, and multiple redundant and/or striped storage disk unit 174. Target channel adapter 172 can be a fully functional host channel adapter.

SAN 100 handles data communications for I/O and interprocessor communications. SAN 100 supports high-bandwidth and scalability required for I/O and also supports the extremely low latency and low CPU overhead required for interprocessor communications. User clients can bypass the operating system kernel process and directly access network communication hardware, such as host channel adapters, which enable efficient message passing protocols. SAN 100 is suited to current computing models and is a building block for new forms of I/O and computer cluster communication. Further, SAN 100 in FIG. 1 allows I/O adapter nodes to communicate among themselves or communicate with any or all of the processor nodes in distributed computer system. With an I/O adapter attached to the SAN 100, the resulting I/O adapter node has substantially the same communication capability as any host processor node in SAN 100.

In one embodiment, the SAN 100 shown in FIG. 1 supports channel semantics and memory semantics. Channel semantics is sometimes referred to as send/receive or push communication operations. Channel semantics are the type of communications employed in a traditional I/O channel where a source device pushes data and a destination device determines a final destination of the data. In channel semantics, the packet transmitted from a source process specifies a destination processes' communication port, but does not specify where in the destination processes' memory space the packet will be written. Thus, in channel semantics, the destination process pre-allocates where to place the transmitted data.

In memory semantics, a source process directly reads or writes the virtual address space of a remote node destination process. The remote destination process need only communicate the location of a buffer for data, and does not need to be involved in the transfer of any data. Thus, in memory semantics, a source process sends a data packet containing the destination buffer memory address of the destination process. In memory semantics, the destination process previously grants permission for the source process to access its memory.

Channel semantics and memory semantics are typically both necessary for I/O and interprocessor communications. A typical I/O operation employs a combination of channel and memory semantics. In an illustrative example I/O operation of the distributed computer system shown in FIG. 1, a host processor node, such as host processor node 102, initiates an I/O operation by using channel semantics to send a disk write command to a disk I/O adapter, such as RAID subsystem target channel adapter (TCA) 172. The disk I/O adapter examines the command and uses memory semantics to read the data buffer directly from the memory space of the host processor node. After the data buffer is read, the disk I/O adapter employs channel semantics to push an I/O completion message back to the host processor node.

In one exemplary embodiment, the distributed computer system shown in FIG. 1 performs operations that employ virtual addresses and virtual memory protection mechanisms to ensure correct and proper access to all memory. Applications running in such a distributed computed system are not required to use physical addressing for any operations.

Figure 2:
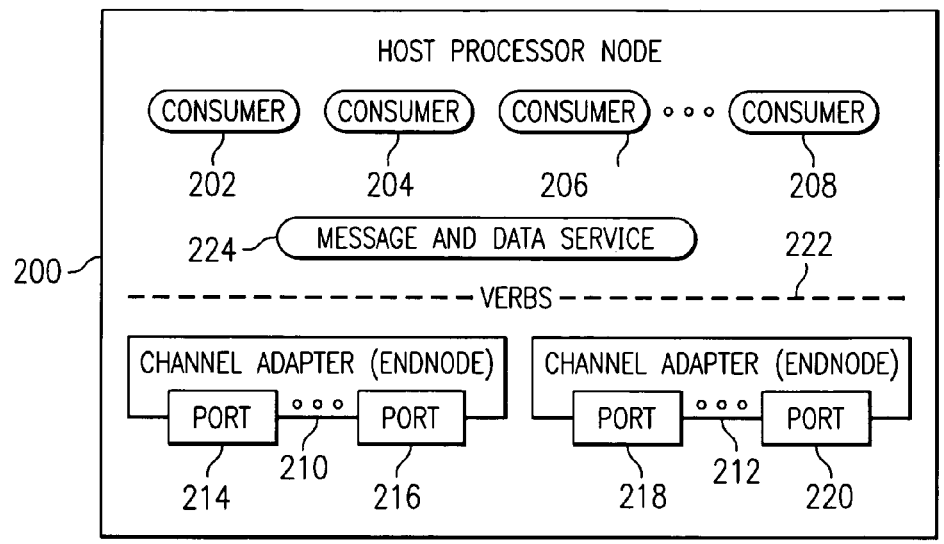
FIG. 2 is a functional block diagram of a host processor node in accordance with a preferred embodiment of the present invention.

Turning next to FIG. 2, a functional block diagram of a host processor node is depicted in accordance with a preferred embodiment of the present invention. Host processor node 200 is an example of a host processor node, such as host processor node 102 in FIG. 1. In this example, host processor node 200 shown in FIG. 2 includes a set of consumers 202–208, which are processes executing on host processor node 200. Host processor node 200 also includes channel adapter 210 and channel adapter 212. Channel adapter 210 contains ports 214 and 216 while channel adapter 212 contains ports 218 and 220. Each port connects to a link. The ports can connect to one SAN subnet or multiple SAN subnets, such as SAN 100 in FIG. 1. In these examples, the channel adapters take the form of host channel adapters.

Consumers 202–208 transfer messages to the SAN via the verbs interface 222 and message and data service 224. A verbs interface is essentially an abstract description of the functionality of a host channel adapter. An operating system may expose some or all of the verb functionality through its programming interface. Basically, this interface defines the behavior of the host. Additionally, host processor node 200 includes a message and data service 224, which is a higher-level interface than the verb layer and is used to process messages and data received through channel adapter 210 and channel adapter 212. Message and data service 224 provides an interface to consumers 202–208 to process messages and other data.

Figure 3A:
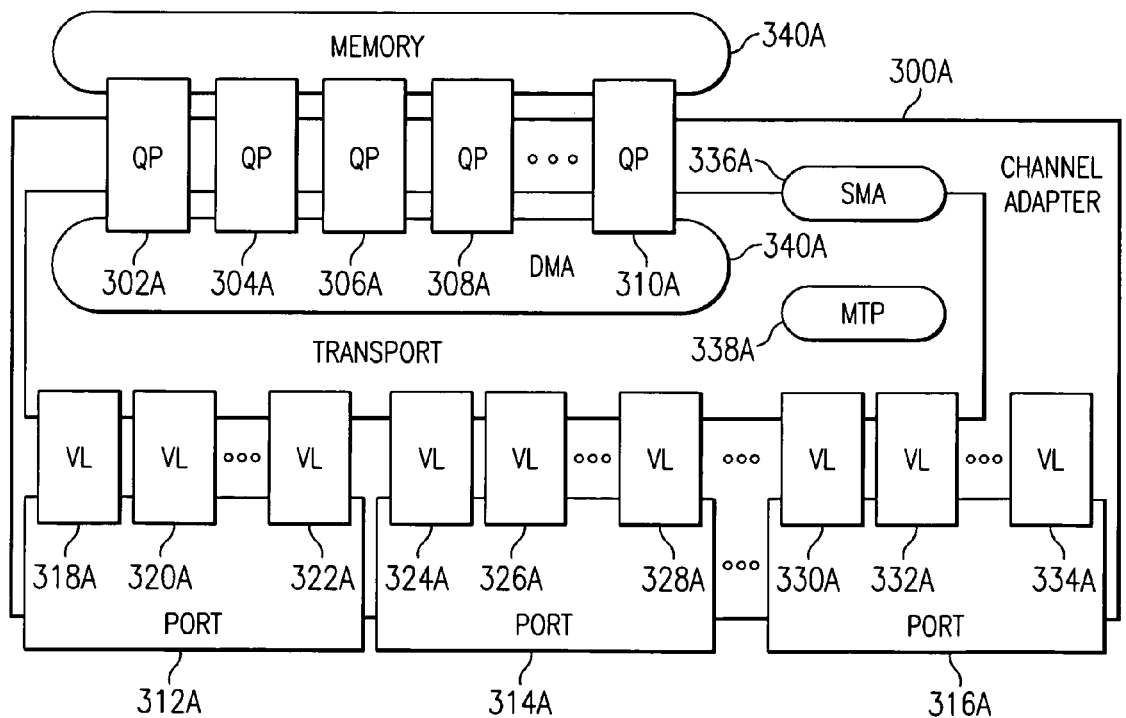
FIG. 3A is a diagram of a host channel adapter in accordance with a preferred embodiment of the present invention.

With reference now to FIG. 3A, a diagram of a host channel adapter is depicted in accordance with a preferred embodiment of the present invention. Host channel adapter 300A shown in FIG. 3A includes a set of queue pairs (QPs) 302A–310A, which are used to transfer messages to the host channel adapter ports 312A–316A. Buffering of data to host channel adapter ports 312A–316A is channeled through virtual lanes (VL) 318A–334A where each VL has its own flow control. Subnet manager configures channel adapters with the local addresses for each physical port, i.e., the port's LID. Subnet manager agent (SMA) 336A is the entity that communicates with the subnet manager for the purpose of configuring the channel adapter. Memory translation and protection (MTP) 338A is a mechanism that translates virtual addresses to physical addresses and validates access rights. Direct memory access (DMA) 340A provides for direct memory access operations using memory 340A with respect to queue pairs 302A–310A.

A single channel adapter, such as the host channel adapter 300A shown in FIG. 3A, can support thousands of queue pairs. By contrast, a target channel adapter in an I/O adapter typically supports a much smaller number of queue pairs. Each queue pair consists of a send work queue (SWQ) and a receive work queue. The send work queue is used to send channel and memory semantic messages. The receive work queue receives channel semantic messages. A consumer calls an operating-system specific programming interface, which is herein referred to as verbs, to place work requests (WRs) onto a work queue.

Figure 3B:
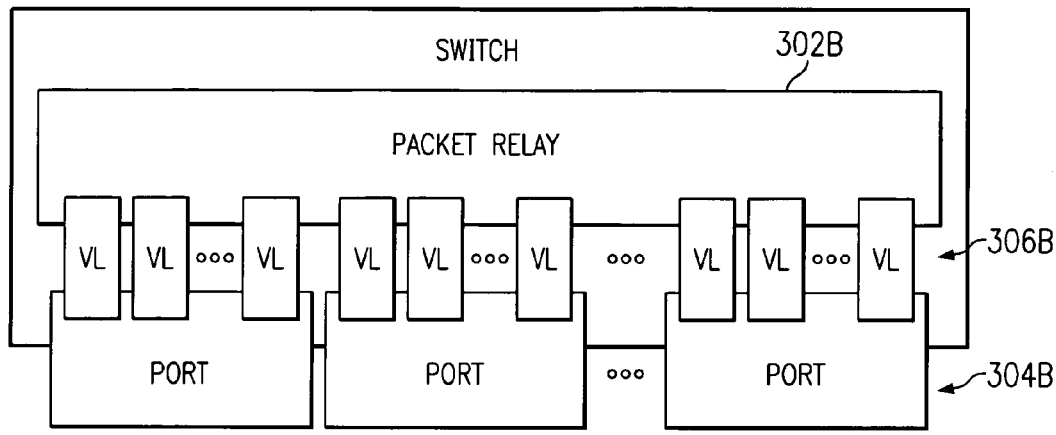
FIG. 3B is a diagram of a switch in accordance with a preferred embodiment of the present invention.

FIG. 3B depicts a switch 300B in accordance with a preferred embodiment of the present invention. Switch 300B includes a packet relay 302B in communication with a number of ports 304B through virtual lanes such as virtual lane 306B. Generally, a switch such as switch 300B can route packets from one port to any other port on the same switch.

Figure 3C:
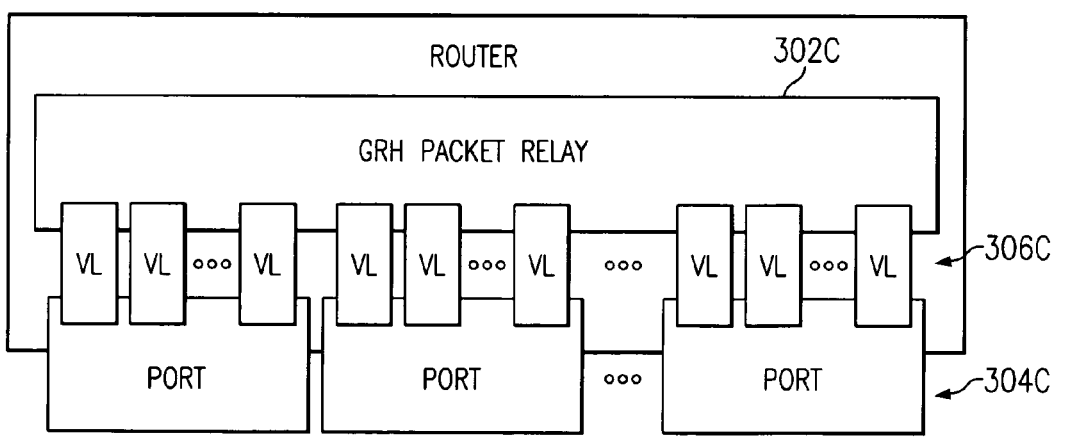
FIG. 3C is a diagram of a router in accordance with a preferred embodiment of the present invention.

Similarly, FIG. 3C depicts a router 300C according to a preferred embodiment of the present invention. Router 300C includes a packet relay 302C in communication with a number of ports 304C through virtual lanes such as virtual lane 306C. Like switch 300B, router 300C will generally be able to route packets from one port to any other port on the same router.

Channel adapters, switches, and routers employ multiple virtual lanes within a single physical link. As illustrated in FIGS. 3A, 3B, and 3C, physical ports connect end nodes, switches, and routers to a subnet. Packets injected into the SAN fabric follow one or more virtual lanes from the packet's source to the packet's destination. The virtual lane that is selected is mapped from a service level associated with the packet. At any one time, only one virtual lane makes progress on a given physical link. Virtual lanes provide a technique for applying link level flow control to one virtual lane without affecting the other virtual lanes. When a packet on one virtual lane blocks due to contention, quality of service (QoS), or other considerations, a packet on a different virtual lane is allowed to make progress. Virtual lanes are employed for numerous reasons, some of which are as follows: Virtual lanes provide QoS. In one example embodiment, certain virtual lanes are reserved for high priority or isochronous traffic to provide QoS.

Virtual lanes provide deadlock avoidance. Virtual lanes allow topologies that contain loops to send packets across all physical links and still be assured the loops won't cause back pressure dependencies that might result in deadlock.

Virtual lanes alleviate head-of-line blocking. When a switch has no more credits available for packets that utilize a given virtual lane, packets utilizing a different virtual lane that has sufficient credits are allowed to make forward progress.

Figure 4:
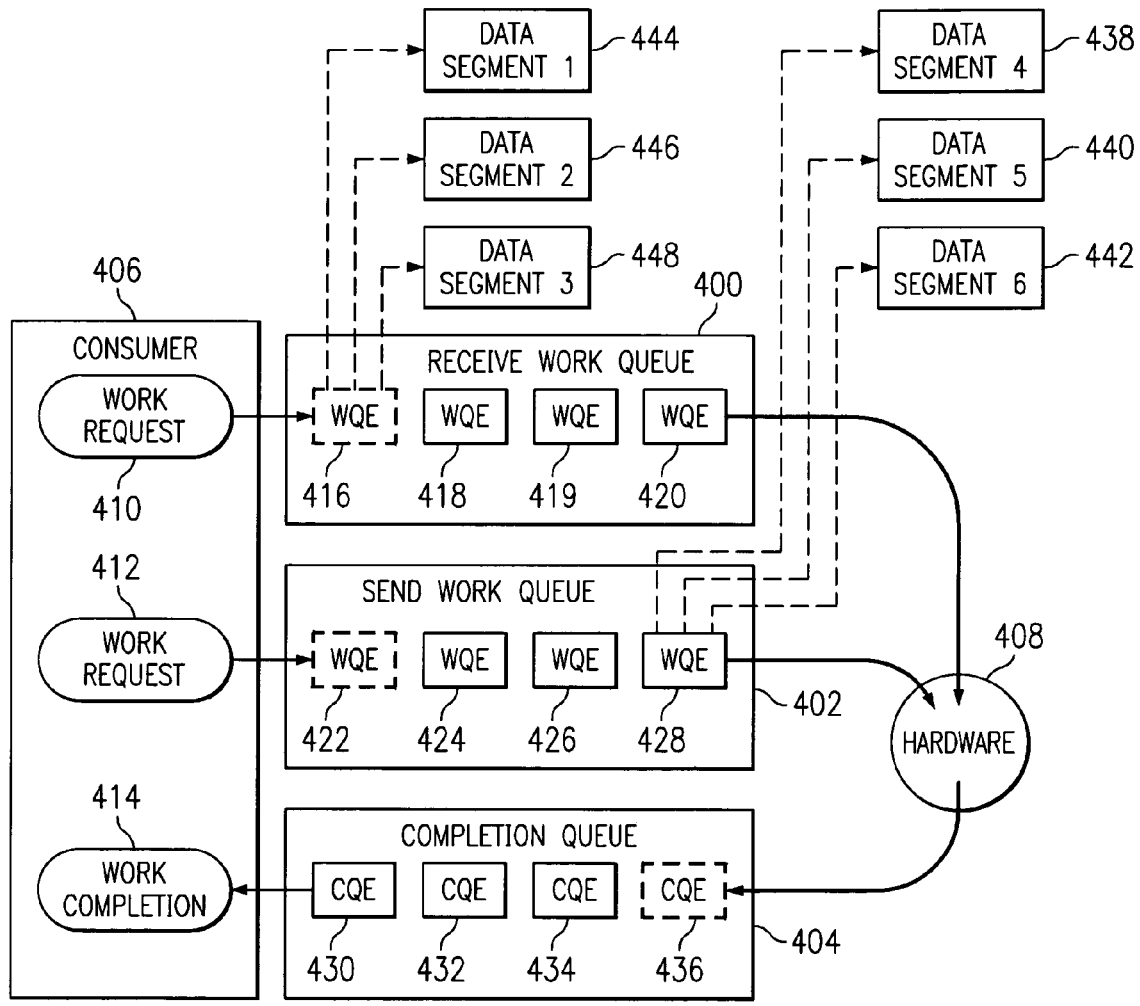
FIG. 4 is a diagram illustrating processing of work requests in accordance with a preferred embodiment of the present invention.

With reference now to FIG. 4, a diagram illustrating processing of work requests is depicted in accordance with a preferred embodiment of the present invention. In FIG. 4, a receive work queue 400, send work queue 402, and completion queue 404 are present for processing requests from and for consumer 406. These requests from consumer 402 are eventually sent to hardware 408. In this example, consumer 406 generates work requests 410 and 412 and receives work completion 414. As shown in FIG. 4, work requests placed onto a work queue are referred to as work queue elements (WQEs).

Send work queue 402 contains work queue elements (WQEs) 422–428, describing data to be transmitted on the SAN fabric. Receive work queue 400 contains work queue elements (WQEs) 416–420, describing where to place incoming channel semantic data from the SAN fabric. A work queue element is processed by hardware 408 in the host channel adapter.

The verbs also provide a mechanism for retrieving completed work from completion queue 404. As shown in FIG. 4, completion queue 404 contains completion queue elements (CQEs) 430–436. Completion queue elements contain information about previously completed work queue elements. Completion queue 404 is used to create a single point of completion notification for multiple queue pairs. A completion queue element is a data structure on a completion queue. This element describes a completed work queue element. The completion queue element contains sufficient information to determine the queue pair and specific work queue element that completed. A completion queue context is a block of information that contains pointers to, length, and other information needed to manage the individual completion queues.

Example work requests supported for the send work queue 402 shown in FIG. 4 are as follows. A send work request is a channel semantic operation to push a set of local data segments to the data segments referenced by a remote node's receive work queue element. For example, work queue element 428 contains references to data segment 4 438, data segment 5 440, and data segment 6 442. Each of the send work request's data segments contains a virtually contiguous memory region. The virtual addresses used to reference the local data segments are in the address context of the process that created the local queue pair.

A remote direct memory access (RDMA) read work request provides a memory semantic operation to read a virtually contiguous memory space on a remote node. A memory space can either be a portion of a memory region or portion of a memory window. A memory region references a previously registered set of virtually contiguous memory addresses defined by a virtual address and length. A memory window references a set of virtually contiguous memory addresses that have been bound to a previously registered region.

The RDMA Read work request reads a virtually contiguous memory space on a remote end node and writes the data to a virtually contiguous local memory space. Similar to the send work request, virtual addresses used by the RDMA Read work queue element to reference the local data segments are in the address context of the process that created the local queue pair. For example, work queue element 416 in receive work queue 400 references data segment 1 444, data segment 2 446, and data segment 448. The remote virtual addresses are in the address context of the process owning the remote queue pair targeted by the RDMA Read work queue element.

A RDMA Write work queue element provides a memory semantic operation to write a virtually contiguous memory space on a remote node. The RDMA Write work queue element contains a scatter list of local virtually contiguous memory spaces and the virtual address of the remote memory space into which the local memory spaces are written.

A RDMA FetchOp work queue element provides a memory semantic operation to perform an atomic operation on a remote word. The RDMA FetchOp work queue element is a combined RDMA Read, Modify, and RDMA Write operation. The RDMA FetchOp work queue element can support several read-modify-write operations, such as Compare and Swap if equal.

A bind (unbind) remote access key (R_Key) work queue element provides a command to the host channel adapter hardware to modify (destroy) a memory window by associating (disassociating) the memory window to a memory region. The R_Key is part of each RDMA access and is used to validate that the remote process has permitted access to the buffer.

In one embodiment, receive work queue 400 shown in FIG. 4 only supports one type of work queue element, which is referred to as a receive work queue element. The receive work queue element provides a channel semantic operation describing a local memory space into which incoming send messages are written. The receive work queue element includes a scatter list describing several virtually contiguous memory spaces. An incoming send message is written to these memory spaces. The virtual addresses are in the address context of the process that created the local queue pair.

For interprocessor communications, a user-mode software process transfers data through queue pairs directly from where the buffer resides in memory. In one embodiment, the transfer through the queue pairs bypasses the operating system and consumes few host instruction cycles. Queue pairs permit zero processor-copy data transfer with no operating system kernel involvement. The zero processor-copy data transfer provides for efficient support of high-bandwidth and low-latency communication.

When a queue pair is created, the queue pair is set to provide a selected type of transport service. In one embodiment, a distributed computer system implementing the present invention supports four types of transport services: reliable, unreliable, reliable datagram, and unreliable datagram connection service.

Reliable and Unreliable connected services associate a local queue pair with one and only one remote queue pair. Connected services require a process to create a queue pair for each process that is to communicate with over the SAN fabric. Thus, if each of N host processor nodes contain P processes, and all P processes on each node wish to communicate with all the processes on all the other nodes, each host processor node requires $P^2 \times (N-1)$ queue pairs. Moreover, a process can connect a queue pair to another queue pair on the same host channel adapter.

Figure 5:
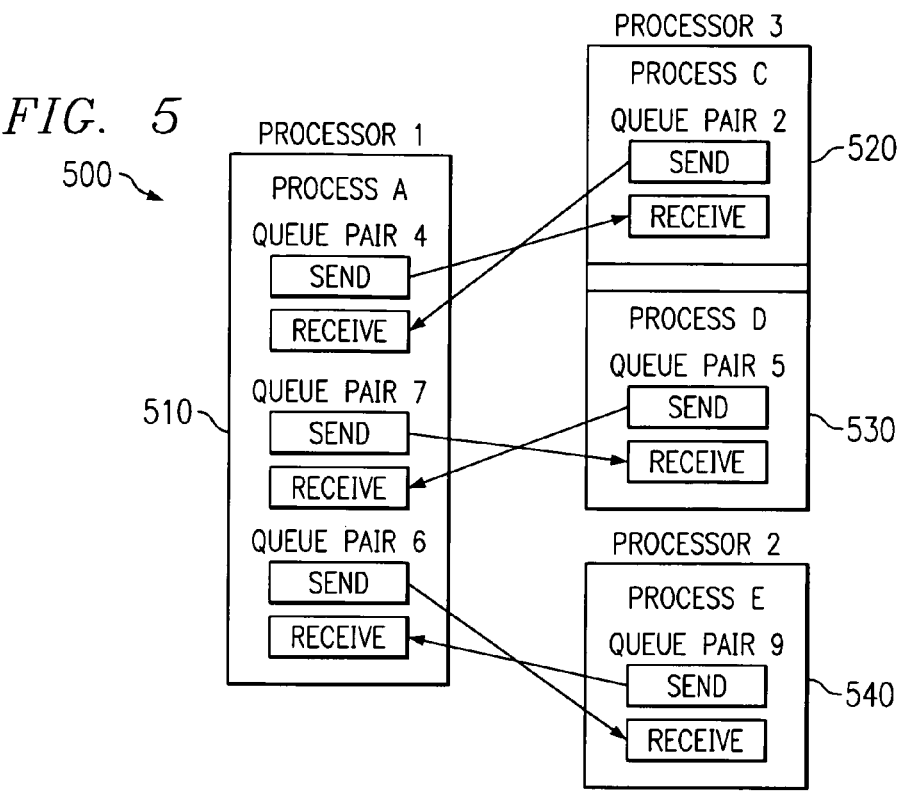
FIG. 5 is a diagram illustrating a portion of a distributed computer system in accordance with a preferred embodiment of the present invention in which a reliable connection service is used.

A portion of a distributed computer system employing a reliable connection service to communicate between distributed processes is illustrated generally in FIG. 5. The distributed computer system 500 in FIG. 5 includes a host processor node 1, a host processor node 2, and a host processor node 3. Host processor node 1 includes a process A 510. Host processor node 2 includes a process C 520 and a process D 530. Host processor node 3 includes a process E 540.

Host processor node 1 includes queue pairs 4, 6 and 7, each having a send work queue and receive work queue. Host processor node 2 has a queue pair 9 and host processor node 3 has queue pairs 2 and 5. The reliable connection service of distributed computer system 500 associates a local queue pair with one an only one remote queue pair. Thus, the queue pair 4 is used to communicate with queue pair 2; queue pair 7 is used to communicate with queue pair 5; and queue pair 6 is used to communicate with queue pair 9.

A WQE placed on one queue pair in a reliable connection service causes data to be written into the receive memory space referenced by a Receive WQE of the connected queue pair. RDMA operations operate on the address space of the connected queue pair.

In one embodiment of the present invention, the reliable connection service is made reliable because hardware maintains sequence numbers and acknowledges all packet transfers. A combination of hardware and SAN driver software retries any failed communications. The process client of the queue pair obtains reliable communications even in the presence of bit errors, receive underruns, and network congestion. If alternative paths exist in the SAN fabric, reliable communications can be maintained even in the presence of failures of fabric switches, links, or channel adapter ports.

In addition, acknowledgments may be employed to deliver data reliably across the SAN fabric. The acknowledgment may, or may not, be a process level acknowledgment, i.e. an acknowledgment that validates that a receiving process has consumed the data. Alternatively, the acknowledgment may be one that only indicates that the data has reached its destination.

Reliable datagram service associates a local end-to-end (EE) context with one and only one remote end-to-end context. The reliable datagram service permits a client process of one queue pair to communicate with any other queue pair on any other remote node. At a receive work queue, the reliable datagram service permits incoming messages from any send work queue on any other remote node.

The reliable datagram service greatly improves scalability because the reliable datagram service is connectionless. Therefore, an end node with a fixed number of queue pairs can communicate with far more processes and end nodes with a reliable datagram service than with a reliable connection transport service. For example, if each of N host processor nodes contain P processes, and all P processes on each node wish to communicate with all the processes on all the other nodes, the reliable connection service requires $P^2 \times (N-1)$ queue pairs on each node. By comparison, the connectionless reliable datagram service only requires P queue pairs+(N−1) EE contexts on each node for exactly the same communications.

Figure 6:
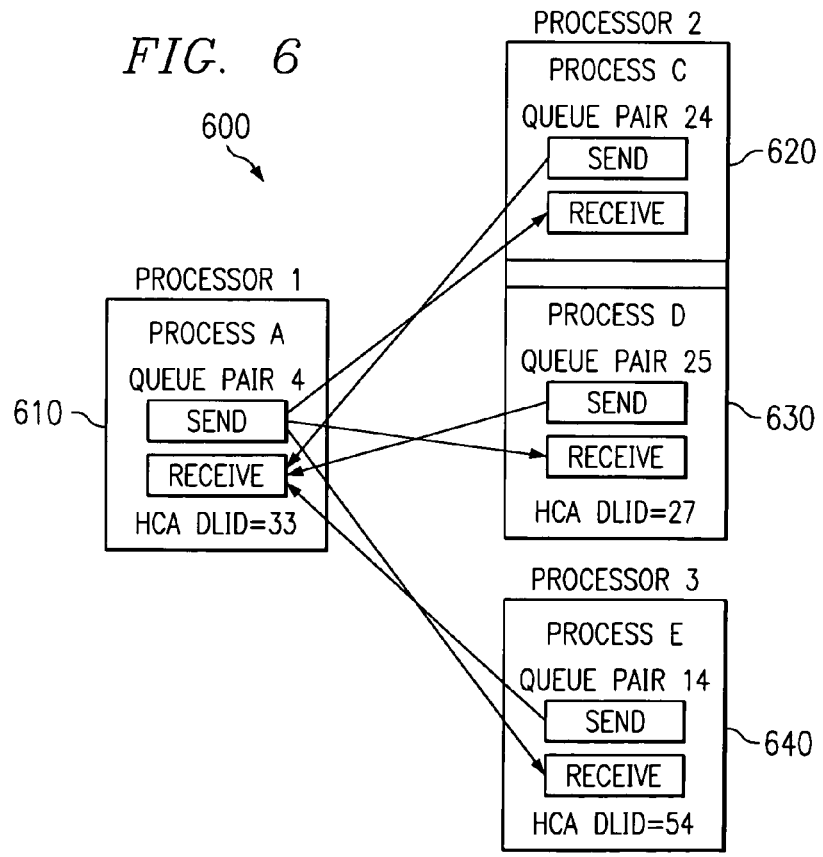
FIG. 6 is a diagram illustrating a portion of a distributed computer system in accordance with a preferred embodiment of the present invention in which reliable datagram service connections are used.

A portion of a distributed computer system employing a reliable datagram service to communicate between distributed processes is illustrated in FIG. 6. The distributed computer system 600 in FIG. 6 includes a host processor node 1, a host processor node 2, and a host processor node 3. Host processor node 1 includes a process A 610 having a queue pair 4. Host processor node 2 has a process C 620 having a queue pair 24 and a process D 630 having a queue pair 25. Host processor node 3 has a process E 640 having a queue pair 14.

In the reliable datagram service implemented in the distributed computer system 600, the queue pairs are coupled in what is referred to as a connectionless transport service. For example, a reliable datagram service couples queue pair 4 to queue pairs 24, 25 and 14. Specifically, a reliable datagram service allows queue pair 4's send work queue to reliably transfer messages to receive work queues in queue pairs 24, 25 and 14. Similarly, the send queues of queue pairs 24, 25, and 14 can reliably transfer messages to the receive work queue in queue pair 4.

In one embodiment of the present invention, the reliable datagram service employs sequence numbers and acknowledgments associated with each message frame to ensure the same degree of reliability as the reliable connection service. End-to-end (EE) contexts maintain end-to-end specific state to keep track of sequence numbers, acknowledgments, and time-out values. The end-to-end state held in the EE contexts is shared by all the connectionless queue pairs communication between a pair of end nodes. Each end node requires at least one EE context for every end node it wishes to communicate with in the reliable datagram service (e.g., a given end node requires at least N EE contexts to be able to have reliable datagram service with N other end nodes).

The unreliable datagram service is connectionless. The unreliable datagram service is employed by management applications to discover and integrate new switches, routers, and end nodes into a given distributed computer system. The unreliable datagram service does not provide the reliability guarantees of the reliable connection service and the reliable datagram service. The unreliable datagram service accordingly operates with less state information maintained at each end node.

Figure 7:
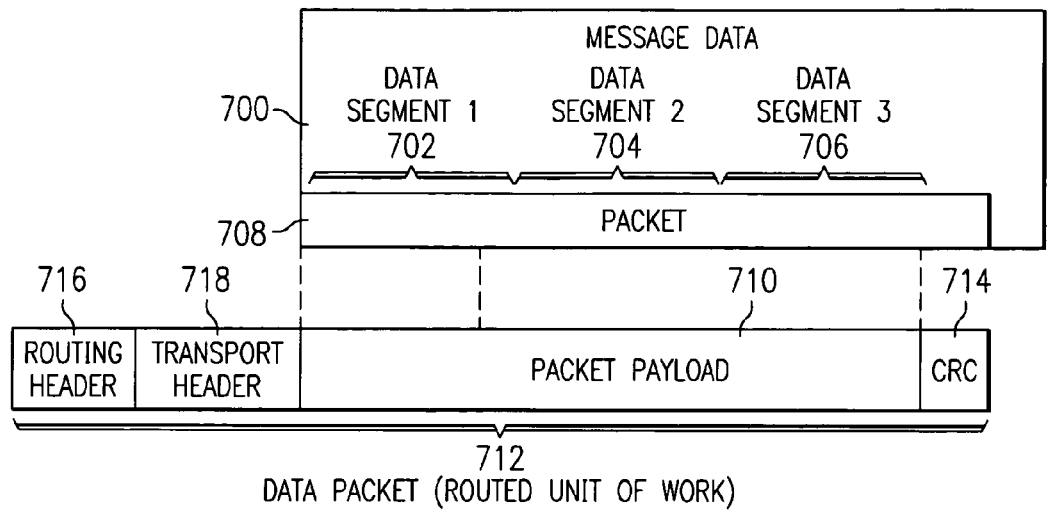
FIG. 7 is an illustration of a data packet in accordance with a preferred embodiment of the present invention.

Turning next to FIG. 7, an illustration of a data packet is depicted in accordance with a preferred embodiment of the present invention. A data packet is a unit of information that is routed through the SAN fabric. The data packet is an end node-to-end node construct, and is thus created and consumed by end nodes. For packets destined to a channel adapter (either host or target), the data packets are neither generated nor consumed by the switches and routers in the SAN fabric. Instead for data packets that are destined to a channel adapter, switches and routers simply move request packets or acknowledgment packets closer to the ultimate destination, modifying the variant link header fields in the process. Routers, also modify the packet's network header when the packet crosses a subnet boundary. In traversing a subnet, a single packet stays on a single service level.

Message data 700 contains data segment 1 702, data segment 2 704, and data segment 3 706, which are similar to the data segments illustrated in FIG. 4. In this example, these data segments form a packet 708, which is placed into packet payload 710 within data packet 712. Additionally, data packet 712 contains CRC 714, which is used for error checking. Additionally, routing header 716 and transport 718 are present in data packet 712. Routing header 716 is used to identify source and destination ports for data packet 712. Transport header 718 in this example specifies the destination queue pair for data packet 712. Additionally, transport header 718 also provides information such as the operation code, packet sequence number, and partition for data packet 712.

The operating code identifies whether the packet is the first, last, intermediate, or only packet of a message. The operation code also specifies whether the operation is a send RDMA write, read, or atomic. The packet sequence number is initialized when communication is established and increments each time a queue pair creates a new packet. Ports of an end node may be configured to be members of one or more possibly overlapping sets called partitions.

Figure 8:
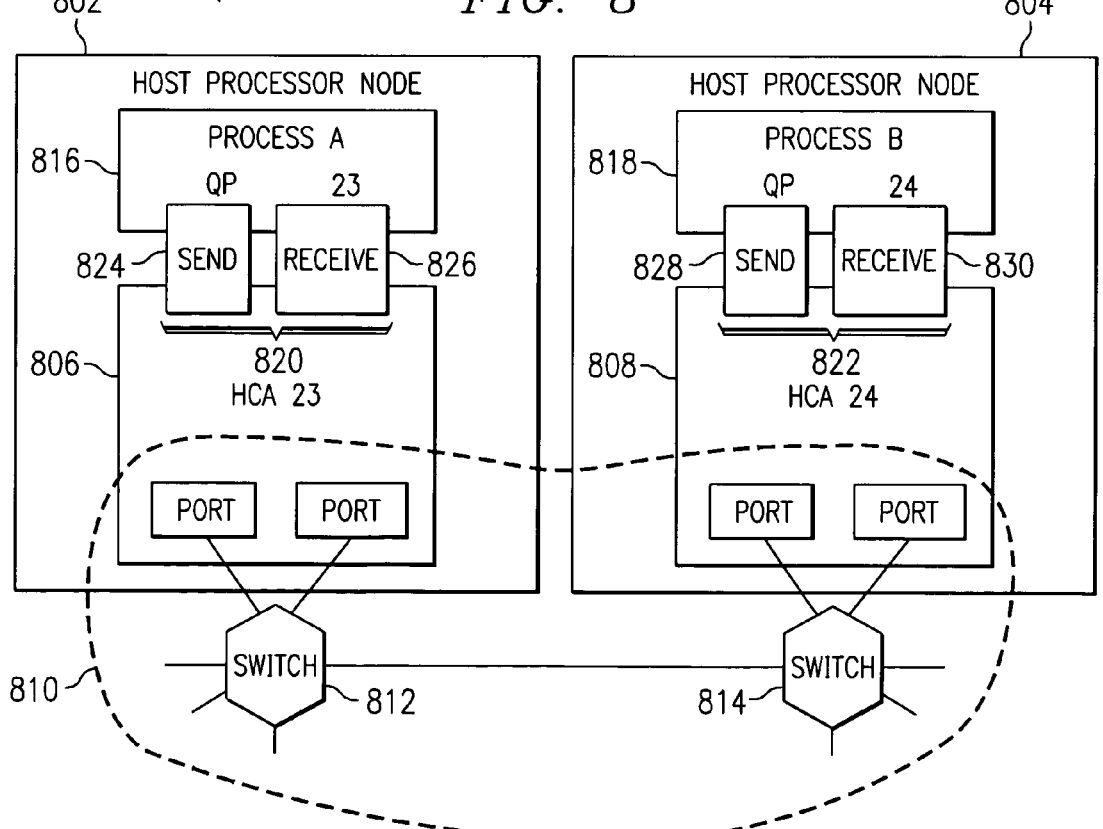
FIG. 8 is a diagram illustrating a portion of a distributed computer system in accordance with a preferred embodiment of the present invention.

In FIG. 8, a portion of a distributed computer system is depicted to illustrate an example request and acknowledgment transaction. The distributed computer system in FIG. 8 includes a host processor node 802 and a host processor node 804. Host processor node 802 includes a host channel adapter 806. Host processor node 804 includes a host channel adapter 808. The distributed computer system in FIG. 8 includes a SAN fabric 810, which includes a switch 812 and a switch 814. The SAN fabric includes a link coupling host channel adapter 806 to switch 812; a link coupling switch 812 to switch 814; and a link coupling host channel adapter 808 to switch 814.

In the example transactions, host processor node 802 includes a client process A. Host processor node 804 includes a client process B. Client process A interacts with host channel adapter hardware 806 through queue pair 824. Client process B interacts with hardware channel adapter hardware 808 through queue pair 828. Queue pairs 824 and 828 are data structures that include a send work queue and a receive work queue. Process A initiates a message request by posting work queue elements to the send queue of queue pair 824. Such a work queue element is illustrated in FIG. 4. The message request of client process A is referenced by a gather list contained in the send work queue element. Each data segment in the gather list points to a virtually contiguous local memory region, which contains a part of the message, such as indicated by data segments 1, 2, and 3, which respectively hold message parts 1, 2, and 3, in FIG. 4.

Hardware in host channel adapter 806 reads the work queue element and segments the message stored in virtual contiguous buffers into data packets, such as the data packet illustrated in FIG. 7. Data packets are routed through the SAN fabric, and for reliable transfer services, are acknowledged by the final destination end node. If not successively acknowledged, the data packet is retransmitted by the source end node. Data packets are generated by source end nodes and consumed by destination end nodes.

Figure 9:
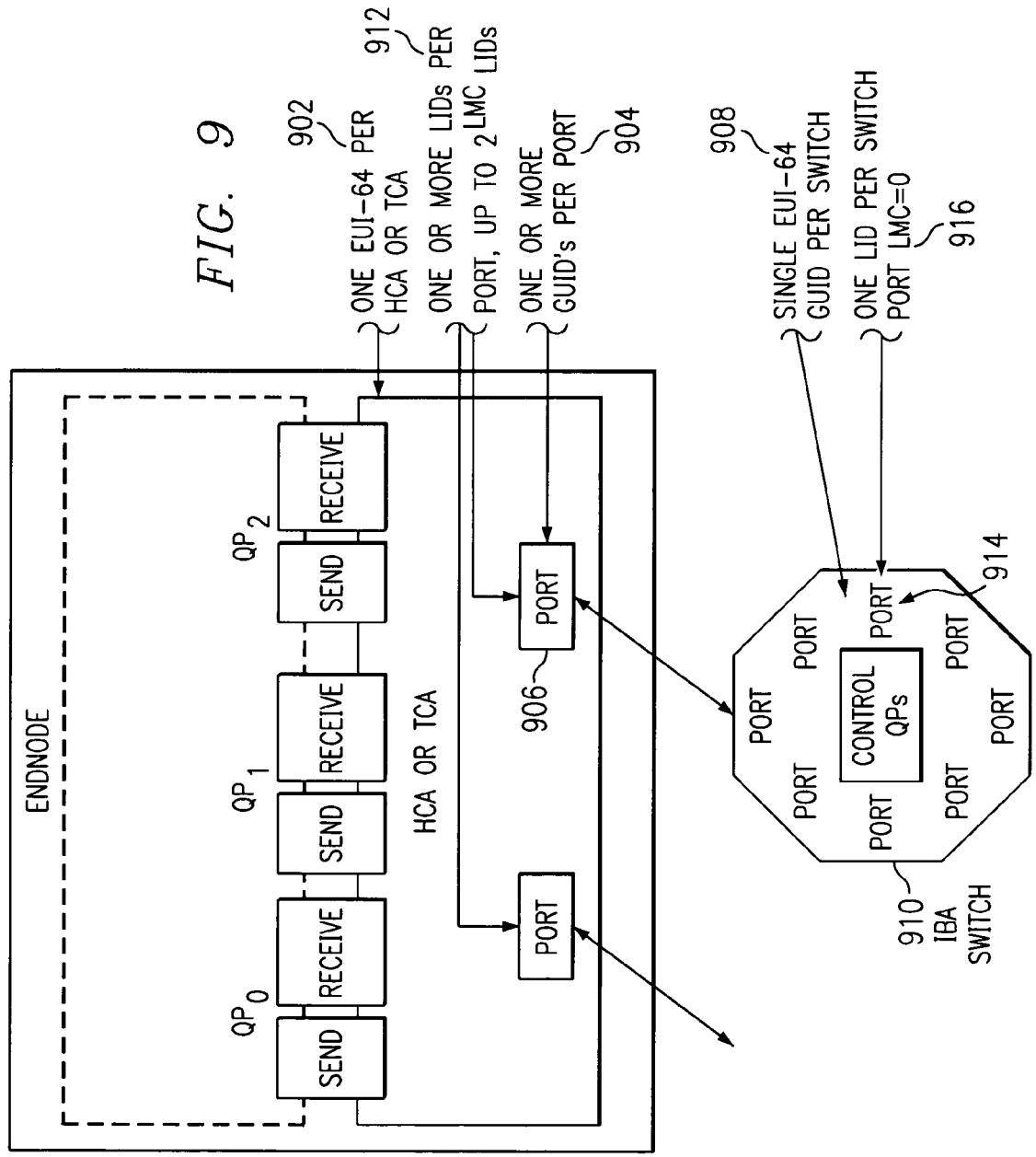
FIG. 9 is a diagram illustrating the network addressing used in a distributed networking system in accordance with the present invention.

In reference to FIG. 9, a diagram illustrating the network addressing used in a distributed networking system is depicted in accordance with the present invention. A host name provides a logical identification for a host node, such as a host processor node or I/O adapter node. The host name identifies the endpoint for messages such that messages are destined for processes residing on an end node specified by the host name. Thus, there is one host name per node, but a node can have multiple CAs. A single IEEE assigned 64-bit identifier (EUI-64) 902 is assigned to each component. A component can be a switch, router, or CA.

One or more globally unique identifiers (GUID) 904 are assigned to each CA port 906. One GUID 908 is assigned to a switch 910.

Multiple GUIDs, e.g., IP addresses, may be assigned to a CA port for any of a number of different reasons. In one embodiment of the present invention, different GUIDs identify different partitions or services on an end node. In a different embodiment, different GUIDs are used to specify different Quality of Service (QoS) attributes. In yet another embodiment, different GUIDs identify different paths through intra-subnet routes. These exemplary embodiments are not exhaustive of all of the reasons why multiple GUIDs per CA port may be used but are only provided as examples.

A local ID (LID) refers to a short address ID used to identify a CA port within a single subnet. In one example embodiment, a subnet has up to $2^{16}$ end nodes, switches, and routers, and the LID is accordingly 16 bits. A source LID (SLID) and a destination LID (DLID) are the source and destination LIDs used in a local network header of a data packet. A single CA port can have up to $2^{LMC}$ LIDs 912 assigned to it. The LMC represents the LID Mask Control field in the CA. A mask is a pattern of bits used to accept or reject bit patterns in another set of data.

Multiple LIDs can be used with a single CA port for several reasons. In one embodiment of the present invention, different LIDs identify different partitions or services in an end node. In another embodiment, different LIDs are used to specify different QoS attributes. In yet a further embodiment, different LIDs specify different paths through the subnet. These are not all of the reasons why multiple LIDs may be used with a single CA port but are only offered as examples. A single switch port 914 has one LID 916 associated with it.

A one-to-one correspondence does not necessarily exist between LIDs and GUIDs, because a CA can have more or less LIDs than GUIDs for each port. For CAs with redundant ports and redundant conductivity to multiple SAN fabrics, the CAs can, but are not required to, use the same LID and GUID on each of its ports.

Figure 10:
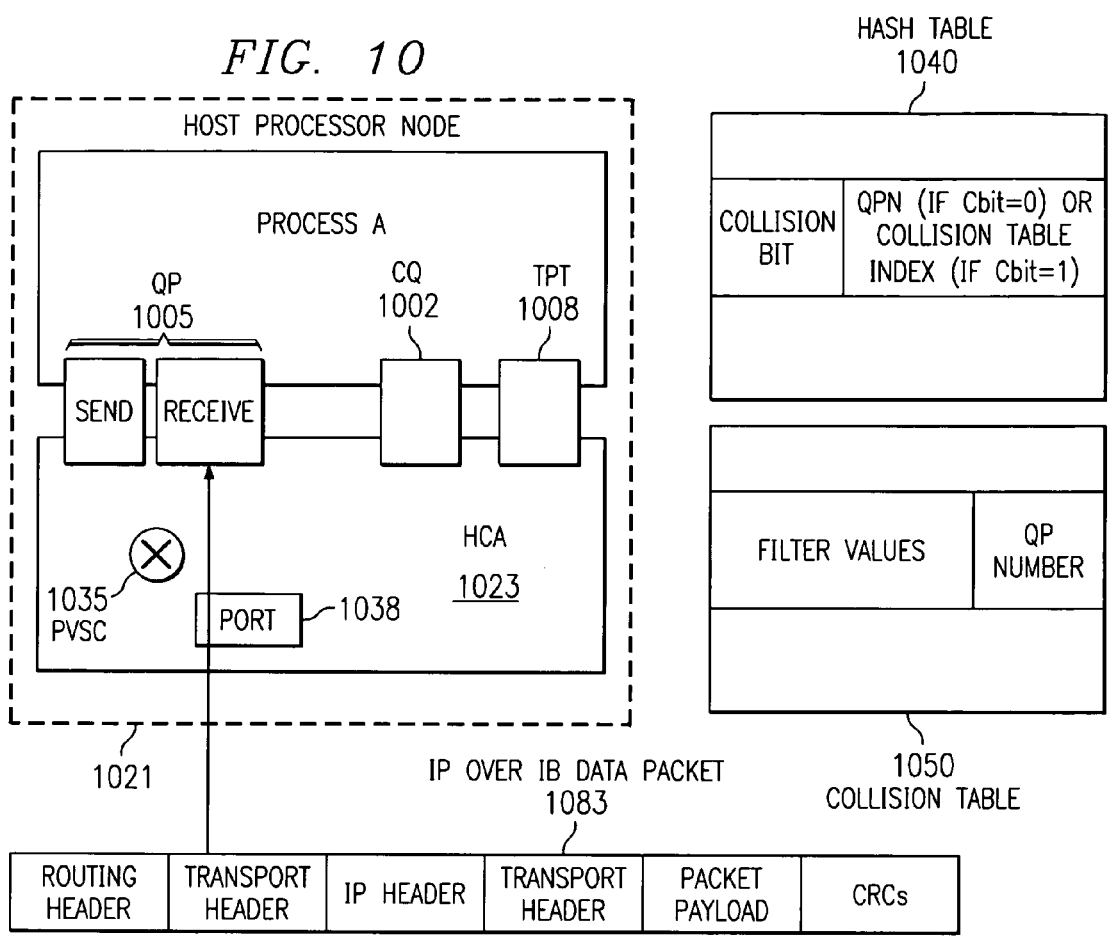
FIG. 10 is an exemplary diagram illustrating the IP filtering mechanism according to the present invention.

Referring to FIG. 10, the present invention adds three mechanisms to support IP filtering on a HCA. The first mechanism is used to set up the HCA's IP filtering attributes; the second mechanism is used to set up the QP's IP filtering attributes; and the third mechanism is used to steer IP packets to the appropriate QP.

The host channel adapter (HCA) 1023 is set up to support IP filtering through the standard InfiniBand verbs. To support the QP filtering and multiplexing mechanism, the present invention adds several output modifiers to the IB Query HCA and several input modifiers to the IB Modify HCA verb. The IB Query HCA verb is used to determine the properties of the HCA. The IB Modify HCA verb is used to set up HCA features. These verbs use input and output modifiers, which are typically implemented as a memory data structure or hardware register.

Under the present invention, the IB Query HCA verb includes the following output modifiers: (1) the maximum number of queue pairs that can be set up to use the IP filters, this field lets the consumer know how many QPs can be configured to use the IP filters. ; (2) whether IP filtering is enabled or not, this field lets the consumer know whether IP filtering is enabled or not; and (3) the type of filters supported by the HCA; this field lets the consumer know which filter types are supported. Under the present invention, the IB Modify HCA verb includes the following input modifiers: (1) filtering enabled, which is set to select filtering and reset to disable filtering, this field lets the consumer enable filtering and is used by the HCA to enable/disable IP filtering; and (2) the types of filters enabled, this field lets the consumer select which filter types are enabled and is used by the HCA to determine which incoming packet fields will be checked on all IP over IB Qps. The consumer will use the Modify and Query QP verb to set the IP filter values of a specific IP over IB. The HCA will add these values to its IP filtering data structure (e.g. hash table) and will route all incoming packets with matching field values to the QP associated with those values.

The filters may be any of a number of different types. These various types of filters include, but are not limited to: a Destination Port Number filter, which corresponds with RFC 793's Destination Port Number; Destination IP Address filter, which corresponds with RFC 791's and RFC 2460's Destination IP Address; Source Port Number filter, which corresponds with RFC 793's Source Port Number; Source IP Address filter, which corresponds with RFC 791's and RFC 2460's Source IP Address; Transport type filter, which corresponds with RFC 791's Protocol; Traffic Class filter, which corresponds with RFC 791's Type of Service or RFC 2460's Traffic Class; Flow Label filter, which corresponds with RFC 2460's Flow Label; and P_Key filter, which corresponds with IB's P_Key. The above RFCs can be obtained from http://www.cis.ohio-state.edu/hypertext/information/rfc.html.

Once the HCA has been set up to support IP filtering under the present invention, Queue Pairs, such as QP 1005, on the HCA can be set up to use the enabled IP filtering mechanisms during packet reception into the QP's receive queue. This is done through the Modify QP and Query QP verbs. The Query QP verb is used to determine the state and properties of the QP. The Modify QP verb is used to set up the QP's state and variable properties. The IP over IB QP, such as QP 1005, can be a normal QP, an IB Special Raw Datagram QP, or the like.

The present invention adds the following output modifiers to the Query QP verb: (1) IP over IB enabled, this field lets the consumer determine if the HCA has IP over IB enabled; and (2) the types of filters enabled through the Modify HCA verb, the HCA returns the list of enabled IP filters, thereby letting the consumer know which IP filters must have values associated with them. The Query QP returns the same list of filter types as the Query HCA. This provides a QP consumer, which may have direct access to the Query QP verb, but not have access to the HCA verbs, a more direct method of determining which filters are enabled.

The present invention adds the following input modifiers to the Modify QP verb: (1) an IP over IB enabled input modifier, this field lets the consumer enable IP over IB on the QP. When the field is set the HCA will compare the IP filter values in the QP context with the values in the fields of incoming IP over IB packets; and (2) the value for each filter type, this field lets the consumer set the values for each of the enabled IP filters and lets the HCA store these values in its IP filter data structure (e.g. Hash table). The HCA will only pass incoming packets with matching fields to the QP's receive queue. The IP over IB input modifier enables IP filter on the QP. The filter values are used to filter incoming packets, select only those that have the filter values, and then route those packets to the QP which has those filter attributes.

Once the HCA and QP have been set up to enable IP filtering, as described above, the HCA uses the packet filtering and steering mechanism described herein to deliver incoming packets to the appropriate QP. Using this mechanism, the IP and TCP headers of all incoming IP over IB packets, such as IP over IB packet 1083, will be compared against the filter values selected by IP over IB QPs to determine which specific QP shall receive the packet. The QP which has a matching set of attributes shall receive the packet.

The comparison can be implemented as a state machine, as code in an embedded microprocessor, as a content addressable memory, or the like. The comparison can compare each IP field using one or more of these mechanisms, use one of several well known data structure techniques such as a hash table lookup, or the like.

In a preferred embodiment of the present invention, the comparison is performed using a processor embedded in the HCA. with code that implements a chained hash table 1040. Using this approach when a QP is modified to set the IP filter values through the Modify QP verb described earlier, a hash function is computed. The hash computation can be any type of hash computation. In a preferred embodiment, the low order 10 bits that result from an unsigned two's complement addition of all the filter values is used. The resulting hash value represents the offset into the IP filter hash table which contains the QP number associated with the filter values. If only one hash table value resolves to the same has the table entry, then the collision bit is not set and the table entry will contain the QP number associated with the IP filter values. The collision bit can be implemented in the same table or in a different table that has a one (collision bit) entry for every (QP Number) entry in the hash table.

If more than one set of values resolve to the same IP filter hash table entry, i.e. a hash table entry collision, then the collision bit is set and a collision table 1050 is used to determine an appropriate QP to receive the data packet. The collision bit is set during the execution of the Modify QP verb by the HCA when the filter values of two or more QPs have the same hash value. Later when the QPs are in use, the hash table function is applied to incoming packet's filter values, thereby creating the hash table value for the incoming packet. If the hash table entry has a collision, then the collision table is used to determine which QP is associated with the incoming packet. Each entry in the collision table 1050 contains the full set of IP filter values and the number of the QP associated with the filter values. A linked list can be used to prevent the collision table 1050 from overflowing.

Under the present invention, when an incoming data packet arrives, the IP filter fields that have been enabled on the HCA are extracted from the data packet. The hash table computation is made on the IP filter field values and a hash table value is computed. The hash table value is used to index into the hash table.

If the table only contains one entry, the entry contains the QP number associated with the incoming packet and the packet is delivered to the receive queue of the identified QP. If the table contains multiple entries, then the rest of the data packet IP filter fields are compared against each entry in the collision table until a match is found. The entry containing the matching set of filter values also contains the QP number associated with the incoming packet and the packet is delivered to the receive queue of the identified QP.

Figure 11:
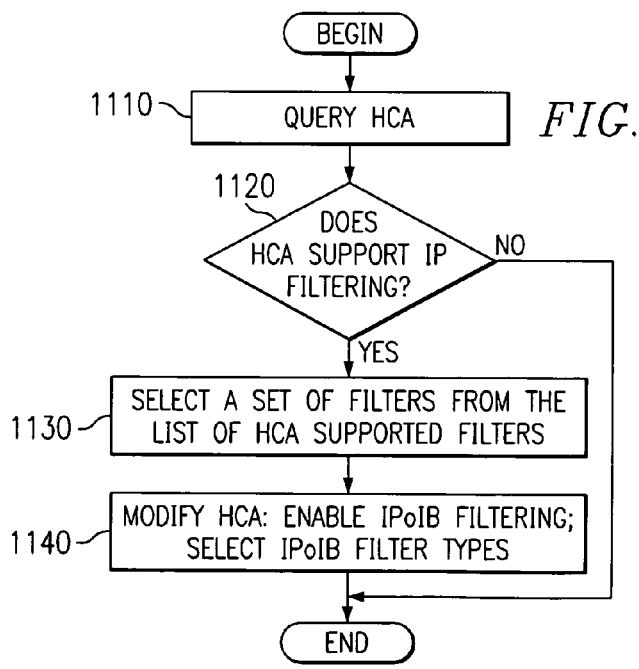
FIG. 11 is a flowchart outlining an exemplary operation of the present invention when setting up an HCA to use IP filtering.

FIG. 11 is a flowchart outlining an exemplary operation of the present invention for use by a consumer enable IP over IB filtering on an HCA that supports IP over IB filtering. As shown in FIG. 11, the operation starts with a query to the HCA to determine if the HCA can be enabled to perform IP filtering (step 1110). A decision is made as to whether the HCA supports IP filtering based on the results of the query (step 1120).

If the HCA supports IP filtering, a set of filters is selected from a list of HCA supported filters (step 1130). The Modify HCA verb is then used to modify the HCA to enable IP over IB filtering and select the IP over IB filter types for the HCA (step 1140). Thereafter, or if the HCA does not support IP filtering (step 1120), the operation ends.

FIG. 12 is a flowchart outlining an exemplary operation for use by a consumer to enable IP over IB on a QP of an HCA that supports IP filtering according to the present invention. As shown in FIG. 12, the queue pair is queried to determine if the queue pair supports IP filtering (step 1210). A determination is then made as to whether the queue pair supports IP filtering (step 1220).

If the queue pair supports IP filtering, a set of filters from a list of HCA supported filters is selected (step 1230). The Modify QP verb is then used to enable IP over IB filtering and to select IP over IB filter types (step 1240). Thereafter, or if the QP does not support IP filtering (step 1220), the operation ends.

FIG. 13 is a flowchart outlining an exemplary operation of the present invention used by an HCA for processing incoming data packets. As shown in FIG. 13, a hash function is used on the incoming packet's filter values to calculate a hash table offset (step 1310). A determination is then made as to whether the hash table entry for the calculated hash table offset contains a collision (step 1320). If not, the QP number in the hash table entry is used to identify the QP to which the data packet is to be routed (step 1330). The incoming data packet is then delivered to the identified QP (step 1340) and the operation ends.

If there is a collision in the hash table entry (step 1320), a collision table address is extracted from the hash table entry (step 1350). The incoming packet's filter values are compared to the filter values in each collision table entry to thereby select a corresponding QP number (step 1360). The collision table entry with matching filter values is identified and the corresponding QP number is extracted (step 1370). The incoming data packet is then delivered to the identified QP (step 1380) and the operation ends.

Several optimizations can be made to the present invention, including:

1) If the HCA supports only one GUID per port, the destination GUID can be removed from the packet filtering and steering mechanism described in this invention. For example, a collision table entry would not need to contain the destination GUID as one of the filters. For example, it could include the source GUID.

2) A second order hash table can be used to resolve collisions. Under this approach the collision table would consist of a linked list of entries where each entry contains, in ascending order, the hash value and the QP number associated with that hash value.

3) The number of filter fields supported by the HCA can be reduced to one. Under this approach only one field in the incoming packet would be examined. The field could be used to index into a table whose entries contain QP numbers. In this way the QP number associated with the field value of an incoming packet would be chosen.

4) Same as (3) above, except the number of fields can be reduced to more than one (e.g. two). All of the more than one field values may be examined and compared to a table to determine a corresponding QP number.

5) A Content Addressable Memory can be used to compare all the filter values stored in the QP context with the incoming packets fields simultaneously and select the QP Number. A content addressable memory (CAM) compares a value, such as the IP filters, with each value stored in the upper portion of the CAM. If a match is found, the lower portion of the CAM contains the QP Number.

While the present invention has been described above with regard to using a hash table and collision table, the present invention is not limited to the use of such data structures. Rather, any data structure or other mechanism that allows for the correlation of filter field values to a particular corresponding QP number may be used without departing from the spirit and scope of the present invention.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of routing data packets to a queue pair, comprising:
receiving a data packet having a header in which one or more Internet Protocol filter values are identified;
identifying a queue pair in a plurality of queue pairs based on the one or more Internet Protocol filter values in the header of the data packet, wherein a single channel adapter supports the plurality of queue pairs; and
routing the data packet to the identified queue pair.

2. The method of claim 1, wherein identifying the queue pair includes:
generating a hash value based on the one or more Internet Protocol filter values; and
retrieving a hash table entry based on the hash value.

3. The method of claim 2, further comprising:
determining if a collision bit in the hash table entry is set; and
retrieving a collision table entry corresponding to the hash table entry if the collision bit is set.

4. The method of claim 3, further comprising:
comparing the one or more Internet Protocol filter values in the header of the data packet to filter values in the collision table entry; and
identifying the queue pair based on the comparison of the one or more Internet Protocol filter values in the header of the data packet to the filter values in the collision table entry.

5. The method of claim 1, wherein the method is implemented in a host channel adapter set up to support filtering.

6. The method of claim 5, wherein the host channel adapter is set up to support filtering by using a Modify HCA verb to enable filtering in the host channel adapter.

7. The method of claim 1, wherein the queue pair is a queue pair that is set up to support filtering by using a Modify QP verb to enable filtering.

8. The method of claim 7, wherein the Modify QP verb identifies the filter value for each filter type enabled from filter types supported by a corresponding host channel adapter.

9. The method of claim 1, wherein the one or more Internet Protocol filter values are Internet Protocol over InfiniBand transport and/or network layer filter values.

10. The method of claim 1, wherein identifying the queue pair in a plurality of queue pairs based on the one or more Internet Protocol filter values in the header of the data packet includes using a content addressable memory.

11. A computer program product in a computer readable medium comprising instructions for executions by a computer for routing data packets to a queue pair, comprising:
first instructions for receiving a data packet having a header in which one or more Internet Protocol filter values are identified;
second instructions for identifying a queue pair in a plurality of queue ours based on the one or more Internet Protocol filter values in the header of the data packet, wherein a single channel adapter supports the plurality of queue pairs; and
third instructions for routing the data packet to the identified queue pair.

12. The computer program product of claim 11, wherein the second instructions for identifying the queue pair include:
instructions for generating a hash value based on the one or more Internet Protocol filter values; and
instructions for retrieving a hash table entry based on the bash value.

13. The computer program product of claim 12, further comprising:
instructions for determining if a collision bit in the hash table entry is set; and
instructions for retrieving a collision table entry corresponding to the hash table entry if the collision bit is set.

14. The computer program product of claim 13, further comprising:
instructions for comparing the one or more Internet Protocol filter values in the header of the data packet to filter values in the collision table entry; and
instructions for identifying the queue pair based on the comparison of the one or more Internet Protocol filter values in the header of the data packet to the filter values in the collision table entry.

15. The computer program product of claim 11, wherein the computer program product is executed in a host channel adapter set up to support filtering.

16. The computer program product of claim 15, wherein the host channel adapter is set up to support filtering by using a Modify HCA verb to enable filtering in the host channel adapter.

17. The computer program product of claim 11, wherein the queue pair is a queue pair that is set up to support filtering by using a Modify QP verb to enable filtering.

18. The computer program product of claim 17, wherein the Modify QP verb identifies the filter value for each filter type enabled from filter types supported by a corresponding host channel adapter.

19. The computer program product of claim 11, wherein the one or more Internet Protocol filter values are Internet Protocol over InfiniBand transport and/or network filter values.

20. The computer program product of claim 11, wherein the second instructions for identifying the queue pair in a plurality queue pairs based on the one or more Internet Protocol filter values in the header of the data packet include instructions for using a content addressable memory.

21. An apparatus for routing data packets to a queue pair, comprising:
means for receiving a data packet having a header in which one or more Internet Protocol filter values are identified;
means for identifying a queue pair in a plurality of queue pairs based on the one or more Internet Protocol filter values in the header of the data packet, wherein a single channel adapter supports the plurality of queue pairs; and
means for routing the data packet to the identified queue pair.

22. The apparatus of claim 21, wherein the means for identifying the queue pair includes:
means for generating a hash value based on the one or more Internet Protocol filter values; and
means for retrieving a hash table entry based on the hash value.

23. The apparatus of claim 22, further comprising:
means for determining if a collision bit in the hash table entry is set; and means for retrieving a collision table entry corresponding to the hash table entry if the collision bit is set.

24. The apparatus of claim 23, further comprising:
means for comparing the one or more Internet Protocol filter values in the header of the data packet to filter values in the collision table entry; and
means for identifying the queue pair based on the comparison of the one or more Internet Protocol filter values in the header of the data packet to the filter values in the collision table entry.

25. The apparatus of claim 21, wherein the apparatus is part of a host channel adapter set up to support filtering.

26. The apparatus of claim 25, wherein the host channel adapter is set up to support filtering by using a Modify HCA verb to enable filtering in the host channel adapter.

27. The apparatus of claim 21, wherein the queue pair is a queue pair that is set up to support filtering by using a Modify QP verb to enable filtering.

28. The apparatus of claim 27, wherein the Modify QP verb identifies the filter value for each filter type enabled from filter types supported by a corresponding host channel adapter.

29. The apparatus of claim 21, wherein the one or more Internet Protocol filter values are Internet Protocol over infiniBand transport and/or network filter values.

30. The apparatus of claim 21, wherein the means for identifying the queue pair in a plurality of queue pairs based on the one or more Internet Protocol filter values in the header of the data packet includes means for using a content addressable memory.

* * * * *